(12) United States Patent
Tanaka et al.

(10) Patent No.: US 7,833,685 B2
(45) Date of Patent: Nov. 16, 2010

(54) COLORING COMPOUND AND YELLOW TONER CONTAINING THE COLORING COMPOUND

(75) Inventors: Masatake Tanaka, Yokohama (JP); Yasuaki Murai, Kawasaki (JP); Masayoshi Kato, Tokyo (JP); Takayuki Toyoda, Yokohama (JP); Takeshi Miyazaki, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/119,870

(22) Filed: May 13, 2008

(65) Prior Publication Data

US 2008/0220358 A1    Sep. 11, 2008

Related U.S. Application Data

(63) Continuation of application No. PCT/JP2007/072833, filed on Nov. 27, 2007.

(30) Foreign Application Priority Data

Nov. 30, 2006 (JP) .............................. 2006-323745

(51) Int. Cl.
G03G 9/09 (2006.01)
(52) U.S. Cl. .................................. 430/108.23; 534/772
(58) Field of Classification Search ............ 430/108.23; 534/772; 106/31.48
See application file for complete search history.

(56) References Cited

U.S. PATENT DOCUMENTS

| 3,954,396 | A | | 5/1976 | Ribka et al. |
| 4,015,934 | A | | 4/1977 | Liechti et al. .................. 8/614 |
| 4,305,718 | A | | 12/1981 | Leoffler et al. |
| 4,514,226 | A | | 4/1985 | Leoffler et al. |
| 4,764,599 | A | * | 8/1988 | Colberg et al. .............. 534/740 |
| 7,014,969 | B2 | * | 3/2006 | Yachi et al. .............. 430/108.7 |

FOREIGN PATENT DOCUMENTS

| DE | 1644122 | 9/1967 |
| GB | 1360749 | 5/2008 |
| JP | 03042676 | 2/1991 |
| JP | 3-185074 | 8/1991 |
| JP | 04107567 | 4/1992 |
| JP | 5-331382 | 12/1993 |
| JP | 7-140716 | 6/1995 |
| JP | 9-025423 | 1/1997 |
| JP | 2000-035696 | 2/2000 |
| JP | 2001-166540 | 6/2001 |
| JP | 2003-149859 | 5/2003 |
| JP | 2004-234033 | 8/2004 |
| JP | 2005283725 | 10/2005 |

OTHER PUBLICATIONS

Japanese Patent Office English-language abstract describing JP 03-042676 (pub. Feb. 1991).*
International Preliminary Report on Patentability for PCT/JP2007/072833 dated Jun. 11, 2009.

* cited by examiner

*Primary Examiner*—Janis L Dote
(74) *Attorney, Agent, or Firm*—Fitzpatrick, Cella, Harper & Scinto

(57) ABSTRACT

Provided are a coloring compound for color toner which satisfies all of solubility in an organic solvent, a color tone, and lightfastness, and does not inhibit the polymerization of a polymerizable monomer when used in a polymerized toner, and a yellow toner using the coloring compound and achieving compatibility between a good color tone and excellent lightfastness, in which, the coloring compound has a structure represented by the following formula (1).

Formula (1)

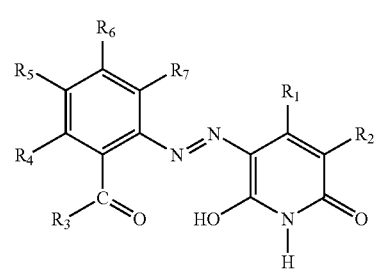

6 Claims, 1 Drawing Sheet

COLORING COMPOUND AND YELLOW TONER CONTAINING THE COLORING COMPOUND

CROSS-REFERENCE TO RELATED APPLICATIONS

This application is a continuation of International Application No. PCT/JP2007/072833, filed Nov. 27, 2007.

FIELD OF THE INVENTION

The present invention relates to a novel coloring compound. In particular, the present invention relates to a coloring compound effective as a colorant for yellow toner to be used in an electrophotographic method, an electrostatic recording method, an electrostatic printing method, or a toner jet recording method, and a yellow toner using the coloring compound.

DESCRIPTION OF THE RELATED ART

As a method of forming a visible image with toner, there are known an electrophotographic method, an electrostatic recording method, an electrostatic printing method, a toner jet recording method, and the like. For example, the electrophotographic method generally involves: forming an electrostatic latent image on a photosensitive member containing a photoconductive substance by using various means; developing the latent image with toner so that the latent image serves as a powder image; transferring the powder image onto paper or the like as required; and fixing the image by means of, for example, heating, pressurization, or solvent steam. In recent years, an image forming device based on the electrophotographic method has been capable of full-color display and of storing information on an image to be recorded as a digital signal, and has started to be used in a professional-use color copying machine to be used in a design studio or the like, or a color copying machine for paperwork. Further, the device has started to be used also in a printer for outputting data from a computer or in a personal printer. Under such circumstances, a recorded image which has good color reproducibility and is excellent in storage stability in a use environment, in particular, excellent in lightfastness has been demanded, so there have been demands for the development of a colorant achieving compatibility between a good color tone and excellent lightfastness.

Meanwhile, known toners are classified into the following toners depending on a method of producing toner particles: a pulverized toner produced by a pulverization method and a chemical toner produced by a suspension polymerization method or an emulsion polymerization method. The pulverization method is a method involving: melting and kneading a mixture containing, for example, a binder resin, a colorant, and a charge control agent with a device capable of mixing the materials under heat such as a heating kneader or a twin roll; cooling the kneaded product after the melting and the kneading to solidify the product; pulverizing the solidified product with a mechanical or air collision type pulverizer such as a ball mill or a jet mill; and classifying the pulverized product to provide toner particles each having a desired particle diameter. The suspension polymerization method is a method involving: uniformly dissolving or dispersing a polymerizable monomer, a colorant, a charge control agent, a polymerization initiator, and any other additive to prepare a polymerizable monomer composition; loading the composition into an aqueous phase containing a suspension stabilizer to subject the composition to suspension polymerization; separating the resultant by filtration; and drying the resultant to provide toner particles each having a desired particle diameter. The emulsion polymerization method is a method involving: subjecting a monomer to emulsion polymerization in a liquid to which an emulsion of a needed additive has been added to produce resin fine particles; adding an organic solvent, an agglomerate reagent, and the like to the fine particles to cause the fine particles to associate with each other; separating the resultant by filtration; and drying the resultant to provide toner particles each having a desired particle diameter. In particular, in the production of a chemical toner, in order that toner particles having a uniform composition may be produced, the development of a colorant having high solubility in an organic solvent such as a polymerizable monomer has been desired. Further, an additive such as a colorant may inhibit the polymerization of a polymerizable monomer in a toner to be produced by any one of various polymerization methods, so it is also important for a coloring compound to have the characteristic that the compound does not inhibit the polymerization.

A monoazo-based pigment (see JP 2000-35696 A and JP 2003-149859 A) and a polyazo-based pigment (see JP 2001-166540 A and JP2004-234033A) have been conventionally disclosed as colorants for yellow toner. Each of those pigments has good lightfastness but shows insufficient solubility in an organic solvent and an insufficient color tone.

Meanwhile, for the purpose of achieving improved solubility in an organic solvent and an improved color tone, a toner using a pyridoneazo-based dye typified by C.I. Solvent Yellow 162 as a coloring dye for yellow toner has been disclosed (see JP Hei 07-140716A and JP Hei 03-42676A). In addition, a pyridoneazo-based dye with improved lightfastness and a pyridoneazo-based dye having high solubility in an organic solvent have also been disclosed (see JP Hei 03-185074 A, JP Hei 05-331382 A and JP Hei 09-25423 A).

However, no coloring compound capable of achieving all of solubility in an organic solvent, a color tone, and lightfastness at high levels has been found, and the additional improvement of a coloring compound has been demanded. In addition, the development of a toner having a good color tone and excellent lightfastness has been demanded.

SUMMARY OF THE INVENTION

Problems to be Solved by the Invention

An object of the present invention is to provide a coloring compound having high solubility in an organic solvent, a good color tone, and excellent lightfastness.

Another object of the present invention is to provide a yellow toner achieving compatibility between a good color tone and excellent lightfastness.

Means for Solving Problem

The above problems are solved by the present invention described below.

That is, the present invention relates to a coloring compound characterized by including a structure represented by the following formula (1):

[Chem 1]

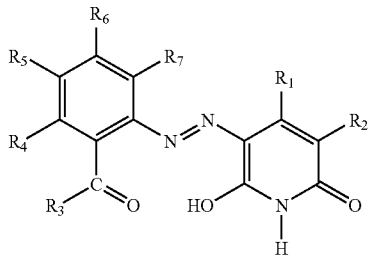

Formula (1)

wherein: $R_1$ represents an alkyl group or an aryl group; $R_2$ represents a hydrogen atom, a cyano group, or —$CONH_2$; $R_3$ represents an alkyloxy group, an alkenyloxy group, an aryloxy group, an aralkyloxy group, or —$NR_8R_9$ wherein $R_8$ and $R_9$ each independently represent a hydrogen atom, an alkyl group, an aryl group, an alkenyl group, or an aralkyl group, and $R_8$ and $R_9$ each may form a heterocycle; and $R_4$, $R_5$, $R_6$, and $R_7$ each independently represent a hydrogen atom, a halogen atom, —$CF_3$, —$NO_2$, an alkyl group, or an alkyloxy group.

Further, the present invention relates to a yellow toner including yellow toner particles each having at least a binder resin and a colorant, the colorant containing the coloring compound having a structure represented by the formula (1).

Effect of the Invention

According to the present invention, there is provided a coloring compound having high solubility in an organic solvent, a good color tone, and excellent lightfastness by virtue of the fact that the coloring compound has a structure represented by the above formula (1). In addition, there is provided a yellow toner achieving compatibility between a good color tone and excellent lightfastness by using the coloring compound as a colorant for the yellow toner.

DETAILED DESCRIPTION OF THE INVENTION

Figure 1:
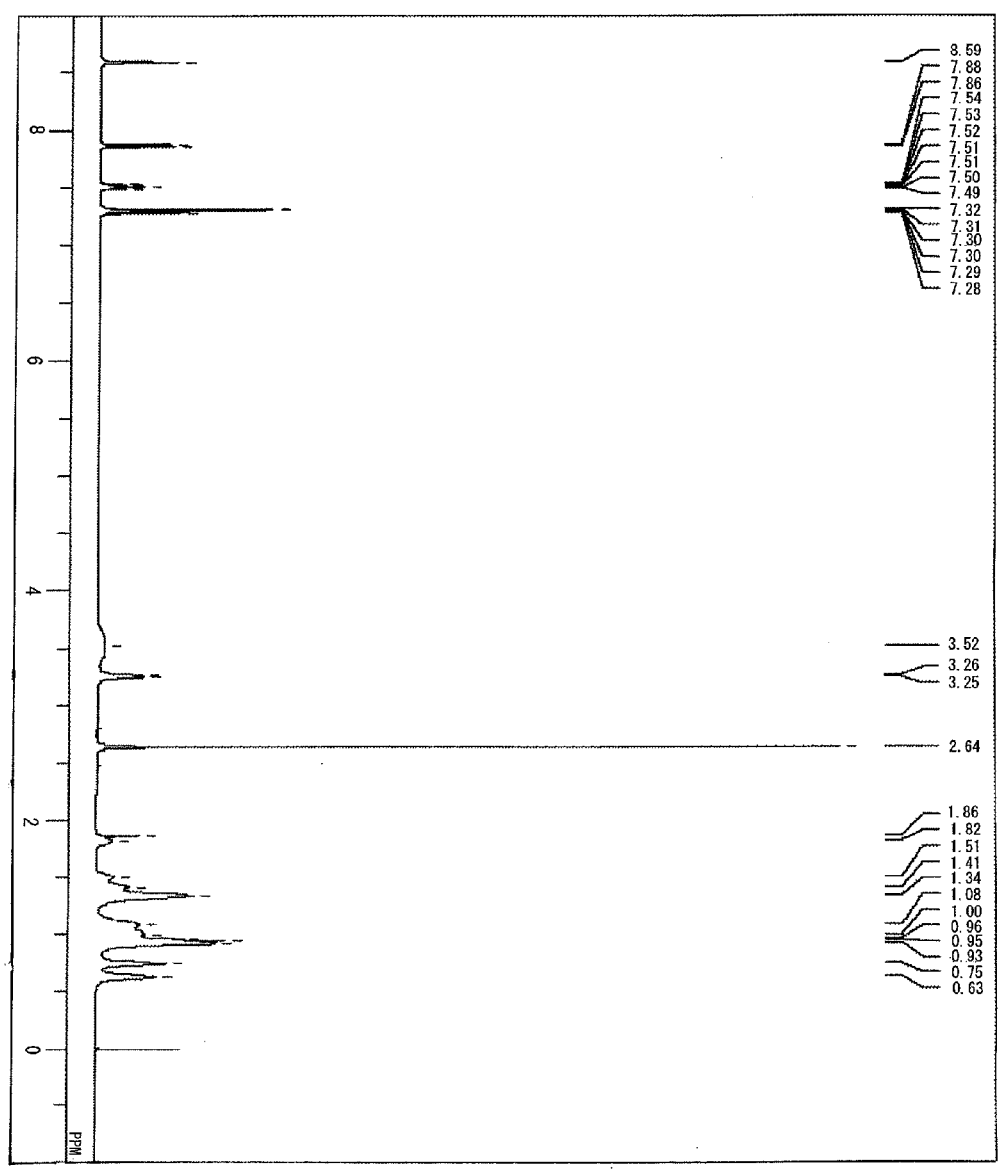
FIG. 1 is a view showing the $^1H$ NMR spectrum of Coloring Compound D1 according to the present invention in chloroform-d at room temperature and 400 MHz.

Hereinafter, a coloring compound of the present invention will be described in more detail.

The inventors of the present invention have made extensive studies with a view to solving the above-mentioned problems of the related art. As a result, the inventors have found that a coloring compound represented by the formula (1) has high solubility in an organic solvent, a good color tone, and excellent lightfastness. In addition, the inventors have found that a yellow toner that has a good color tone and is excellent in lightfastness can be produced by using the coloring compound as a colorant. Thus, the inventors have reached the present invention. First, a coloring compound having a structure represented by the formula (1) to be provided by the present invention will be described in detail.

Examples of the alkyl group represented by $R_1$ include, but not particularly limited to, a methyl group, an ethyl group, an n-propyl group, an isopropyl group, an n-butyl group, a sec-butyl group, a tert-butyl group, and a 2-ethylhexyl group. $R_1$ may represent an aryl group, and examples of the aryl group include, but not particularly limited either to, a phenyl group and a naphthyl group. $R_1$ represents such alkyl or aryl group as described above, and each of those groups may be additionally substituted by a substituent. In this case, the substituent by which each of the groups may be substituted is preferably a nonionic group such as an alkyl group, a halogen atom, —$CF_3$, or —$NO_2$. $R_1$ particularly suitably represents a methyl group or a phenyl group in terms of the ease of availability of a raw material for the compound.

$R_2$ represents, for example, a hydrogen atom, a cyano group, or —$CONH_2$. $R_2$ particularly preferably represents a cyano group in terms of the lightfastness of the compound and the ease of availability of a raw material for the compound.

Examples of the alkyloxy group represented by $R_3$ include, but not particularly limited to, a methoxy group, an ethoxy group, an n-propoxy group, an iso-propoxy group, an butoxy group, a sec-butoxy group, a tert-butoxy group, an n-pentyloxy group, an iso-pentyloxy group, an n-hexyloxy group, an iso-hexyloxy group, a 2-ethylhexyloxy group, a 3,5,5-trimethylhexyloxy group, an n-heptyloxy group, an n-octyloxy group, an n-nonyloxy group, and a cyclohexyloxy group. $R_3$ may represent an alkenyloxy group, and examples of the alkenyloxy group include, but not particularly limited either to, a 2-propene-1-oxy group, a 3-butene-2-oxy group, a 1-pentene-3-oxy group, and a 3,7-dimethyl-6-octene-1-oxy group. $R_3$ may represent an aryloxy group, and examples of the aryloxy group include, but not particularly limited either to, a phenoxy group, a methylphenoxy group, a dimethylphenoxy group, a methoxyphenoxy group, a chlorophenoxy group, a bromophenoxy group, a fluorophenoxy group, a trifluoromethylphenoxy group, a naphthyloxy group, and a 4-octylphenoxy group. $R_3$ may represent an aralkyloxy group, and examples of the aralkyloxy group include, but not particularly limited either to, a benzyloxy group and a diphenylmethoxy group. $R_3$ may represent —$NR_8R_9$. In this case, $R_8$ and $R_9$ each independently represent a hydrogen atom, an alkyl group, an aryl group, an alkenyl group, or an aralkyl group. Alternatively, —$NR_8R_9$ may form a heterocycle. $R_3$ represents such alkyloxy, alkenyloxy, aryloxy, or aralkyloxy group as described above, or —$NR_8R_9$, and each of those groups may be additionally substituted by a substituent. In this case, the substituent by which each of the groups may be substituted is preferably a nonionic group such as an alkyl group, a halogen atom, —$CF_3$, or —$NO_2$.

Examples of the alkyl group represented by each of $R_8$ and $R_9$ include, but not particularly limited to, a methyl group, an ethyl group, an n-propyl group, an isopropyl group, an n-butyl group, a sec-butyl group, a tert-butyl group, an n-pentyl group, an n-hexyl group, a cyclohexyl group, an n-heptyl group, an n-octyl group, a 2-ethylhexyl group, an n-nonyl group, an n-decyl group, an n-undecyl group, and an n-dodecyl group. Examples of the aryl group represented by each of $R_8$ and $R_9$ include a phenyl group and a naphthyl group. Examples of the alkenyl group represented by each of $R_8$ and $R_9$ include a vinyl group, a 1-propenyl group, a 2-propenyl group, a 1-butenyl group, a 2-butenyl group, a 3-butenyl group, a 1-cyclohexenyl group, and a 2-cyclohexenyl group. Examples of the aralkyl group represented by each of $R_8$ and $R_9$ include a benzyl group and a phenethyl group. In addition, specific examples of the heterocycle formed of $R_8$, $R_9$, and a nitrogen atom include a piperazine ring, a piperidine ring, a pyrrolidine ring, and a morpholine ring. $R_8$ and $R_9$ each represent such alkyl, aryl, alkenyl, or aralkyl group as described above, and each of those groups may be additionally substituted by a substituent. In this case, the substituent by which each of the groups may be substituted is preferably a nonionic group such as an alkyl group, a halogen atom, —CF$_3$, or —NO$_2$. R$_3$ particularly suitably represents —NR$_8$R$_9$ in terms of the ease with which the compound is synthesized. In this case, it is preferable that R$_8$ and R$_9$ each independently represent an alkyl group. Further, the total number of the carbon atoms of R$_8$ and R$_9$ is preferably 12 or more in terms of the solubility of the compound in an organic solvent, and is preferably 24 or less in terms of the ease with which the compound is produced.

R$_4$, R$_5$, R$_6$, and R$_7$ each independently represent a hydrogen atom, a halogen atom, —CF$_3$, —NO$_2$, an alkyl group, or an alkyloxy group. Examples of the halogen atom represented by each of R$_4$, R$_5$, R$_6$, and R$_7$ include a fluorine atom, a chlorine atom, a bromine atom, and an iodine atom. Examples of the alkyl group represented by each of R$_4$, R$_5$, R$_6$, and R$_7$ include, but not particularly limited to, a methyl group, an ethyl group, an n-propyl group, an isopropyl group, an n-butyl group, a sec-butyl group, a tert-butyl group, and a 2-ethylhexyl group. R$_4$, R$_5$, R$_6$, and R$_7$ may each represent an alkyloxy group, and examples of the alkyloxy group include, but not particularly limited either to, a methoxy group, an ethoxy group, an n-propoxy group, an iso-propoxy group, an n-butoxy group, an iso-butoxy group, a tert-butoxy group, an n-pentyloxy group, an iso-pentyloxy group, an n-hexyloxy group, an iso-hexyloxy group, a 2-ethylhexyloxy group, a 3,5,5-trimethylhexyloxy group, an n-heptyloxy group, an n-octyloxy group, an n-nonyloxy group, and a cyclohexyloxy group.

The alkyl or alkyloxy group represented by each of R$_4$, R$_5$, R$_6$, and R$_7$ may be additionally substituted by a substituent. In this case, the substituent by which the group may be substituted is a nonionic group such as an alkyl group, a halogen atom, —CF$_3$, or —NO$_2$. R$_4$, R$_5$, R$_6$, and R$_7$ each suitably represent a hydrogen atom in terms of the ease of availability of a raw material for the compound and the lightfastness of the compound.

Each substituent of the coloring compound having a structure represented by the above formula (1) has been described. The coloring compound having a structure represented by the above formula (1) is more preferably a coloring compound having a structure represented by the following formula (2):

[Chem 2]

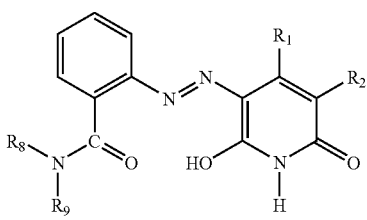

Formula (2)

wherein R$_1$ represents a methyl group or a phenyl group, R$_8$ and R$_9$ each independently represent an alkyl group, or form a heterocycle together with a nitrogen atom, and the total number of the carbon atoms of R$_8$ and R$_9$ is 12 or more and 24 or less.

The coloring compound having a structure represented by the above formula (1) or (2) can be synthesized by a known method. For example, diazo coupling between a compound having a structure represented by the following formula (3) and pyridones compound having a structure represented by the following formula (4) suffices for the synthesis. To be specific, first, an aqueous solution of sodium nitrite is added to the compound having a structure represented by the following formula (3) in hydrochloric acid to diazotize the compound. After the diazotization, the resultant is caused to react with the pyridones compound having a structure represented by the following formula (4) so that a coupling reaction is performed. Further, the reaction product is purified by a recrystallization method or column chromatography as required, whereby the coloring compound having a structure represented by the above formula (1) or (2) can be obtained at a desired purity.

[Chem 3]

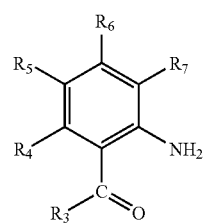

Formula (3)

[Chem 4]

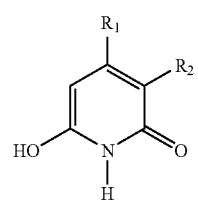

Formula (4)

It should be noted that the coloring compound of the present invention is applicable not only to a colorant but also to an electronic material such as a dyestuff for optical recording or a dyestuff for a color filter.

Next, a yellow toner of the present invention will be described.

The yellow toner of the present invention is a yellow toner having yellow toner particles each having at least a binder resin and a colorant, and is characterized in that the coloring compound according to the present invention is used as a colorant. It should be noted that the content of the coloring compound having a structure represented by the above formula (1) is 1 part by mass to 15 parts by mass, preferably 3 parts by mass to 12 parts by mass, or more preferably 4 parts by mass to 10 parts by mass with respect to 100 parts by mass of the binder resin.

Any one of all binder resins that are generally used for toner can be used as the binder resin for the yellow toner. Examples of the binder resin include a styrene-based resin, an acrylic resin, a styrene/acrylic resin, and a polyester resin.

At least one kind selected from the group consisting of inorganic fine particles and organic fine particles may be externally added to the toner particles for the purpose of improving the flowability of the toner or imparting charge controllability to the toner. Silica fine particles or titania fine particles each having a surface treated with an alkyl group-containing coupling agent are preferably used as such fine particles to be externally added. It should be noted that those particles preferably have a number average primary particle diameter of 10 nm to 50 nm, and further, are preferably added at a content of 0.1 mass % to 20 mass % with respect to the mass of the toner.

The yellow toner according to the present invention can use a yellow pigment together with the coloring compound of the present invention. Examples of the yellow pigment that can be used in the present invention include a monoazo-based pigment, a disazo-based pigment, and a polyazo-based pigment. Of those, for example, C.I. Pigment Yellow 74, C.I. Pigment Yellow 93, C.I. Pigment Yellow 128, and C.I. Pigment Yellow 155 are more preferable. It should be noted that a ratio between the content of the coloring compound having a structure represented by the above formula (1) and the content of the above yellow pigment ((the content of the coloring compound having a structure represented by the above formula (1)): (the content of the yellow pigment)) is preferably 9:1 to 1:9, or more preferably 7:3 to 3:7.

A conventionally known production method can be employed as a method of producing the yellow toner particles. Specific examples of the method include a pulverization method, a suspension polymerization method, and an emulsion polymerization method. In the present invention, the yellow toner particles are preferably toner particles produced by the suspension polymerization method. The coloring compound having a structure represented by the above formula (2) is suitably used in a method involving a polymerization reaction in a production process for toner particles, such as the suspension polymerization method or the emulsion polymerization method, because the compound does not inhibit the polymerization.

In addition, a release agent may be further incorporated into each of the yellow toner particles. A release agent conventionally used for toner can be used as the release agent. Specific examples of the release agent include: low-molecular-weight polypropylene; low-molecular-weight polyethylene; olefins such as an ethylene-propylene copolymer; a microcrystalline wax; a carnauba wax; a Sasol wax; and a paraffin wax. Such release agent is preferably added at a content of 1 mass % to 5 mass % with respect to the mass of the toner.

In addition, a charge control agent may be further incorporated into each of the yellow toner particles. The charge control agent is preferably colorless in terms of the color development property of the toner, and examples of the agent include an agent having a quaternary ammonium salt structure and an agent having a calixarene structure.

The yellow toner of the present invention may be used in a one-component developer having only the toner, or may be used in a two-component developer having the toner and a magnetic carrier. When the toner is used in the two-component developer, each of an uncoated carrier constituted only of a magnetic material particle such as iron or ferrite, and a resin-coated carrier containing a magnetic material particle having a surface coated with a resin may be used as the magnetic carrier. The carrier preferably has a volume average particle diameter of 30 µm to 150 µm.

The yellow toner of the present invention is applicable to a generally employed image forming method without any particular limitation. The toner of the present invention is applicable to, for example, an image forming method including at least: a charging step of charging a photosensitive member for carrying an electrostatic latent image; an exposing step of subjecting the charged photosensitive member to image exposure to form an electrostatic latent image; a developing step of developing the electrostatic latent image with toner to form a toner image; and a transferring step of transferring the toner image formed on the surface of the photosensitive member onto a transfer material. In addition, the toner of the present invention is applicable also to an image forming method of forming a full-color image involving: sequentially transferring toner images formed on a photosensitive member onto an intermediate transfer member in association with the color of each image to form a full-color toner image on the intermediate transfer member; and transferring the full-color toner image onto a transfer material such as paper.

A measurement method and an evaluation method employed in the present invention will be described below.

<Evaluation of Coloring Compound for its Solubility>

A coloring compound was tested for its solubility in a styrene monomer at a temperature of 25° C. of dissolution. The coloring compound was evaluated for its solubility as described below.

A: The percentage by which the coloring compound dissolves in the styrene monomer is 10 mass % or more.

B: The percentage by which the coloring compound dissolves in the styrene monomer is 1 mass % or more and less than 10 mass %.

C: The percentage by which the coloring compound dissolves in the styrene monomer is less than 1 mass %.

The coloring compound was judged to have sufficient solubility when the percentage by which the coloring compound dissolved in the styrene monomer was 1 mass % or more.

<Evaluation of Coloring Compound for Color Tone>

A coloring compound was dissolved in a mixed liquid prepared by mixing tetrahydrofuran and cyclohexanone at a volume ratio of 1:1, whereby a 0.04-mol/l coloring compound solution was prepared. The coloring compound solution was filtrated through a filter (pore diameter: 0.2 µm). The coloring compound solution after the filtration was applied to CLC color copy paper (manufactured by Canon Inc.) with an applicator (film thickness 0.1 mm, manufactured by IMOTO MACHINERY CO., LTD.). Subsequently, the coloring compound solution was diluted by two-fold, and the prepared dilute solution was applied in the same manner as that described above. The operation was repeated, whereby a color tone evaluation sample having 10 levels of gray was produced. The sample was dried with air for one whole day and night, and was analyzed with a spectrophotometer (SPECTROLINO, manufactured by Gretag Macbeth). The chromaticities ($L^*$, $a^*$, $b^*$) of the sample in an $L^*a^*b^*$ colorimetric system were measured, and a chroma ($c^*$) was calculated from the following equation.

$$\text{Chroma} = (c^*) = \sqrt{\{(a^*)^2 + (b^*)^2\}} \quad [\text{Num 1}]$$

It can be said that the larger $c^*$ with $L^*$ kept constant, the better the color tone of the coloring compound. The coloring compound was evaluated for its color tone on the basis of a value for $c^*$ at $L^*=88$.

A: $c^*$ is 80 or more.

B: $c^*$ is 75 or more and less than 80.

C: $c^*$ is less than 75.

The coloring compound was judged to have a good color tone when a value for $c^*$ at $L^*=88$ was 75 or more.

<Evaluation of Coloring Compound for Lightfastness>

A coloring compound was dissolved in a mixed liquid prepared by mixing tetrahydrofuran and cyclohexanone at a volume ratio of 1:1, whereby a 0.04-mol/l coloring compound solution was prepared. The coloring compound solution was filtrated through a filter (pore diameter: 0.2 µm). The coloring compound solution after the filtration was applied to CLC color copy paper (manufactured by Canon Inc.) by a bar coat method (Bar No. 3), and the resultant test paper was dried with air for one whole day and night. Next, the test paper was tested by being irradiated with light from a sun tester (XF-180CPS, manufactured by Shimadzu Corporation) at an illuminance of 765 w/m² and a temperature of 50° C. for an irradiation time of 20 hours. The test paper was analyzed with a spectrophotometer (SPECTROLINO, manufactured by Gretag Macbeth) before and after the irradiation test. The chromaticities (L*, a*, b*) of the test paper in an L*a*b* colorimetric system were measured before and after the irradiation test. A color difference (ΔE) was calculated from the following equation.

$$\text{Color difference}(\Delta E) = \sqrt{\left\{\left(\frac{a^*_{After\ testing} -}{a^*_{Before\ Testing}}\right)^2 + \left(\frac{b^*_{After\ testing} -}{b^*_{Before\ Testing}}\right)^2 + \left(\frac{L^*_{After\ testing} -}{L^*_{Before\ Testing}}\right)^2\right\}}$$ [Num 2]

The coloring compound was evaluated for its lightfastness as described below.
A: ΔE is less than 15.
B: ΔE is 15 or more and less than 30.
C: ΔE is 30 or more.

The coloring compound was judged to have good lightfastness when ΔE was less than 30.

<Measurement of Volume Average Particle Diameter of Toner Particles>

About 0.5 ml of dodecylbenzenesulfonate as a surfactant was added to about 100 ml of a 1% aqueous solution of sodium chloride. Further, about 5 mg of toner particles each serving as a measurement sample were added to the mixture, whereby a sample dispersion was prepared. The sample dispersion was subjected to a dispersion treatment with an ultrasonic dispersing machine for about 1 minute, and its particle size distribution from 2 μm to 40 μm or the like was measured on a volume basis with a COULTER MULTISIZER (manufactured by Beckman Coulter, Inc) using a 100-μm aperture. Then, the volume average particle diameter of the toner particles was calculated.

<Evaluation of Toner for Color Tone>

An image sample having 16 levels of gray with its maximum toner bearing amount adjusted to 0.45 mg/cm² was prepared under an ordinary environment (having a temperature of 25° C. and a humidity of 60% RH) by using a reconstructed machine of a color copying machine CLC-1100 (manufactured by Canon Inc., reconstructed by omitting a fixing oil applying mechanism). In this case, CLC color copy paper (manufactured by Canon Inc.) was used as base paper for the image sample. The resultant image sample was analyzed with a spectrophotometer (SPECTROLINO, manufactured by Gretag Macbeth). The chromaticities (L*, a*, b*) of the sample in an L*a*b* colorimetric system were measured, and a chroma (c*) was calculated from the following equation.

$$\text{Chroma} = (c^*) = \sqrt{\{(a^*)^2 + (b^*)^2\}}$$ [Num 3]

It can be said that the larger c* with L* kept constant, the better the color tone of the toner. Here, the toner was evaluated for its color tone on the basis of a value for c* at L*=91. The toner was judged to have such a good color tone that the toner was useful as yellow toner when a value for c* at L*=91 was 75 or more.

<Evaluation of Toner for Lightfastness>

An image sample having 16 levels of gray with its maximum toner bearing amount adjusted to 0.45 mg/cm² was prepared under an ordinary environment (having a temperature of 25° C. and a humidity of 60% RH) by using a reconstructed machine of a color copying machine CLC-1100 (manufactured by Canon Inc., reconstructed by omitting a fixing oil applying mechanism). In this case, CLC color copy paper (manufactured by Canon Inc.) was used as base paper for the image sample. Next, the test paper was tested by being irradiated with light from an ATLAS WEATHER OMETER (Ci4000, manufactured by Toyo Seiki-Sho. Ltd. The measurement condition in this case was Black Panel: 50° C., Chamber: 40° C., Rel. Humidity: 70% RH, Irradiance (wavelength: 340 nm): 0.39 W/m². The test paper was analyzed with a spectrophotometer (SPECTROLINO, manufactured by Gretag Macbeth) before and after the irradiation test. The chromaticities (L*, a*, b*) of the test paper in an L*a*b* colorimetric system were measured before and after the irradiation test. A color difference (ΔE) was calculated from the following equation.

$$\text{Color difference}(\Delta E) = \sqrt{\left\{\left(\frac{a^*_{Aftertesting} -}{a^*_{BeforeTesting}}\right)^2 + \left(\frac{b^*_{Aftertesting} -}{b^*_{BeforeTesting}}\right)^2 + \left(\frac{L^*_{Aftertesting} -}{L^*_{BeforeTesting}}\right)^2\right\}}$$ [Num 4]

The coloring compound was evaluated for its lightfastness as described below.
A: ΔE is less than 15.
B: ΔE is 15 or more and less than 25.
C: ΔE is 25 or more.

The coloring compound was judged to have good lightfastness when ΔE was less than 25.

DESCRIPTION OF THE EMBODIMENTS

Hereinafter, the present invention will be described in more detail by way of examples and comparative examples. However, the present invention is by no means limited to those examples. It should be noted that the terms "part(s)" and "%" in the following description mean "part(s) by mass" and "mass %", respectively unless otherwise stated.

Example 1

<Synthesis of Coloring Compounds D1 to D16>

A coloring compound having a structure represented by the following formula D1 (hereinafter also referred to as "Coloring Compound D1") was obtained as described below.

[Chem 5]

D1

100 parts of chloroform were added to 10 parts of o-nitrobenzoic acid. Under a nitrogen atmosphere, 29 parts of thionyl chloride were dropped to the mixture. After the completion of the dropping, the mixture was subjected to a reaction at 60° C. for 1 hour. The mixture containing the resultant reaction product was cooled with ice to 10° C. or lower, and 9 parts of triethylamine and 15 parts of di(2-ethylhexyl) amine were dropped to the mixture. After the completion of the dropping, the mixture was subjected to a reaction at 80° C. for 2 hours. After the completion of the reaction, the resultant was extracted with chloroform, and the solution was concentrated, whereby 18 parts of a compound represented by the following formula C1 as an intermediate were obtained.

[Chem 6]

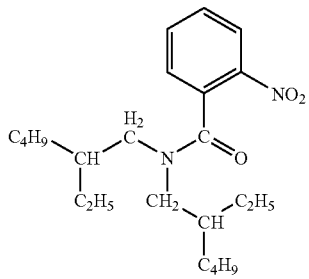

C1

50 parts of ethanol were added to 10 parts of the compound represented by the above formula C1. Further, 18 parts of a 20% aqueous solution of sodium hydrosulfide were added to the mixture, and the whole was subjected to a reaction at 75° C. for 1 hour.

After the completion of the reaction, the resultant was extracted with chloroform, and the solution was concentrated,

[Chem 7]

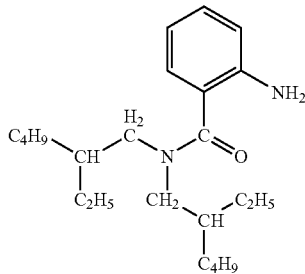

C2 whereby 7.4 parts of a compound represented by the following formula C2 as an intermediate were obtained.

3.4 parts of concentrated hydrochloric acid and 59 parts of methanol were added to 5.9 parts of the compound represented by the above formula C2, and the mixture was cooled with ice to 10° C. or lower. A solution prepared by dissolving 1.4 parts of sodium nitrite in 2.0 parts of water was added to the above solution, and the mixture was subjected to a reaction at the temperature for 1 hour. Next, 0.5 part of sulfamic acid was added to the resultant, and the mixture was stirred for an additional 20 minutes (diazonium salt solution).

Next, 25 parts of N,N-dimethylformamide were added to 2.7 parts of a compound represented by the following formula C3 to dissolve the compound.

[Chem 8]

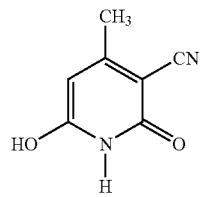

C3

After that, 20 parts of methanol were added to the solution, and the mixture was added to the diazonium salt solution maintained at 10° C. or lower under ice cooling. After that, a saturated aqueous solution of sodium carbonate was added to the resultant to adjust the pH of the resultant to 5 to 6, and the mixture was subjected to a reaction at 10° C. or lower for 2 hours. After the completion of the reaction, the solvent was removed by distillation, and the remainder was purified by column chromatography, whereby 5.2 parts of a coloring compound represented by the above formula D1 were obtained.

Coloring Compound D1 thus obtained was tested for its purity by high performance liquid chromatography [HPLC] (LC2010A, manufactured by Shimadzu Corporation). Further, the structure of the compound was determined with a time-of-flight mass spectrometer [TOF-MS] (LC/MSD TOF, manufactured by Agilent Technologies) and a nuclear magnetic resonance spectrometer [NMR] (ECA-400, manufactured by JEOL Ltd.). It should be noted that an electrospray ionization method [ESI] was employed as a method of ionizing Coloring Compound D1 upon mass spectrometry of Coloring Compound D1.

[Results of Analysis of Coloring Compound D1]

<Results of HPLC>
(Eluant=$CH_3OH/H_2O$=90:10, Flow rate=1.0 ml/min, Detected wavelength=254 nm)
Retention time=9.6 minutes, Purity=99.5 area %

<ESI-TOF-MS Results>
m/z=522.3458 (M$^+$)

<$^1$H NMR (400 MHz, CDCl$_3$, Room Temperature) Results>
δ[ppm]=8.59 (1H, s), 7.87 (1H, d), 7.54-7.49 (1H, m), 7.30 (2H, m), 3.52 (2H, s), 3.25 (2H, d), 2.64 (3H, s), 1.86-1.82 (1H, m), 1.51-0.63 (30H, m)

<$^{13}$C NMR (100 MHz, CDCl$_3$, Room Temperature) Results>
δ[ppm]=10.30, 10.52, 13.86, 14.02, 16.83, 22.87, 23.05, 23.20, 23.82, 28.27, 28.52, 30.02, 30.53, 36.81, 37.13, 47.21, 52.66, 101.79, 113.93, 117.10, 123.84, 126.04, 126.21, 127.99, 130.95, 139.53, 159.79, 159.98, 160.83, 169.08

Coloring Compounds D2 to D16 were each synthesized by a method in conformance with the above synthesis example of Coloring Compound D1 in such a manner that $R_1$ to $R_7$ in the following formula (1) each represented a group shown in Table 1. The structure of each of Coloring Compounds D2 to D16 was identified by HPLC, mass spectrometry, and NMR as in the case of Coloring Compound D1 described above. It should be noted that the symbol "Ph" in Table 1 means a phenyl group.

TABLE 1

Formula (1)

[Chem 9]

Structure: Pyridone azo dye with substituents $R_1$ through $R_7$, with an aryl-C(=O)-$R_3$ group attached via N=N azo linkage to a pyridone ring bearing $R_1$, $R_2$, OH, and N-H C=O.

| Compound Number | $R_1$ | $R_2$ | $R_3$ | $R_4$ | $R_5$ | $R_6$ | $R_7$ |
|---|---|---|---|---|---|---|---|
| D2 | -Ph | —CN | —N[CH$_2$CH(C$_2$H$_5$)C$_4$H$_9$]$_2$ | —H | —H | —H | —H |
| D3 | —CH$_3$ | —CN | —N(C$_6$H$_{13}$)$_2$ | —H | —H | —H | —H |
| D4 | —CH$_3$ | —CN | —N(C$_{12}$H$_{25}$)$_2$ | —H | —H | —H | —H |
| D5 | —CH$_3$ | —CN | —N(C$_{12}$H$_{25}$)$_2$ | —H | —Cl | —H | —H |
| D6 | —C$_4$H$_9$ | —CN | —O(CH$_2$CH(C$_2$H$_5$)C$_4$H$_9$) | —H | —CH$_3$ | —H | —H |
| D7 | —CH$_3$ | —H | —N[CH$_2$CH(C$_2$H$_5$)C$_4$H$_9$]$_2$ | —H | —H | —H | —H |
| D8 | —CH$_3$ | —CN | —O—(C$_6$H$_4$)—(C$_8$H$_{17}$) | —H | —H | —H | —H |
| D9 | —C$_4$H$_9$ | —CN | —O[C$_2$H$_5$CH(CH$_3$)C$_2$H$_5$]—CH=C(CH$_3$)$_2$ | —H | —H | —CH$_3$ | —H |
| D10 | —C$_4$H$_9$ | —CN | —OCHPh$_2$ | —H | —OCH$_3$ | —H | —H |
| D11 | —CH$_3$ | —CN | —N(CH$_2$Ph)$_2$ | —H | —H | —H | —H |
| D12 | —CH$_3$ | —CN | —NPh$_2$ | —H | —H | —H | —H |
| D13 | —C$_4$H$_9$ | —CN | —NH(C$_8$H$_{16}$)—CH=CH—(C$_8$H$_{17}$) | —H | —NO$_2$ | —H | —H |
| D14 | —CH$_3$ | —CONH$_2$ | —N[CH$_2$CH(C$_2$H$_5$)C$_4$H$_9$]$_2$ | —H | —H | —H | —H |
| D15 | —C$_4$H$_9$ | —CN | —NHCH$_2$CH(C$_2$H$_5$)C$_4$H$_9$ | —H | —H | —H | —H |
| D16 | —C$_4$H$_9$ | —CN | —N(piperidinyl with CH—C$_3$H$_7$) | —H | —H | —H | —H |

<Evaluation of Coloring Compounds>

Each of Coloring Compounds D1 to D16 described above was evaluated for its solubility, color tone, and lightfastness. Table 3 shows the results.

Comparative Example 1

Comparative Coloring Compounds E1 to E11 were each synthesized by a method in conformance with the above synthesis example of Coloring Compound D1 in such a manner that $R_1'$ to $R_8'$ in the following formula (5) each represented a group shown in Table 2.

TABLE 2

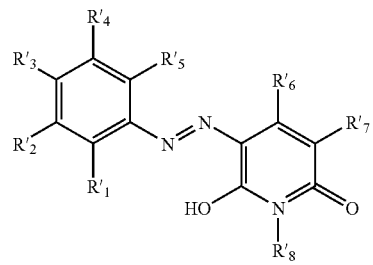

Formula (5)

[Chem 10]

| Compound Number | R'$_1$ | R'$_2$ | R'$_3$ | R'$_4$ | R'$_5$ | R'$_6$ | R'$_7$ | R'$_8$ |
|---|---|---|---|---|---|---|---|---|
| E1 | —H | —H | —C$_4$H$_9$ | —H | —H | —CH$_3$ | —CN | —H |
| E2 | —H | —H | —Cl | —H | —H | —CH$_3$ | —CN | —C$_4$H$_9$ |
| E3 | —H | —H | —SO$_2$NHCH$_2$CH(C$_2$H$_5$)C$_4$H$_9$ | —H | —H | —CH$_3$ | —CN | —C$_4$H$_9$ |
| E4 | —H | —H | —N(CH$_3$)$_2$ | —H | —H | —CH$_3$ | —CN | —C$_2$H$_4$Cl |
| E5 | —H | —H | —COOCH$_3$ | —H | —H | —CH$_3$ | —CN | —C$_4$H$_9$ |
| E6 | —H | —H | —CON[CH$_2$CH(C$_2$H$_5$)C$_4$H$_9$]$_2$ | —H | —H | —CH$_3$ | —CN | —C$_2$H$_5$ |
| E7 | —H | —H | —H | —CH$_3$ | —H | —CH$_3$ | —CN | —C$_4$H$_9$ |
| E8 | —NO$_2$ | —H | —H | —H | —H | —CH$_3$ | —CN | —C$_4$H$_9$ |
| E9 | —H | —CON[CH$_2$CH(C$_2$H$_5$)C$_4$H$_9$]$_2$ | —H | —H | —H | —CH$_3$ | —CN | —H |
| E10 | —H | —H | —CON[CH$_2$CH(C$_2$H$_5$)C$_4$H$_9$]$_2$ | —H | —H | —CH$_3$ | —CN | —H |
| E11 | —CON[CH$_2$CH(C$_2$H$_5$)C$_4$H$_9$]$_2$ | —H | —H | —H | —H | —CH$_3$ | —CN | —C$_2$H$_5$ |

<Evaluation of Comparative Coloring Compounds>

Each of Coloring Compounds E1 to E11 described above was evaluated for its solubility, color tone, and lightfastness. Table 3 shows the results.

TABLE 3

| Compound Number | Solubility | Lightfastness | Color tone |
|---|---|---|---|
| D1 | A | A | A |
| D2 | A | A | A |
| D3 | A | A | A |
| D4 | A | A | A |
| D5 | A | B | A |
| D6 | B | B | A |
| D7 | B | B | A |
| D8 | B | A | A |
| D9 | B | B | A |
| D10 | B | B | A |
| D11 | B | A | A |
| D12 | B | A | A |
| D13 | A | B | B |
| D14 | B | B | A |
| D15 | B | A | B |
| D16 | B | A | A |
| E1 | B | C | C |
| E2 | B | C | B |
| E3 | A | C | A |
| E4 | B | C | C |
| E5 | C | C | B |
| E6 | A | C | A |
| E7 | B | C | C |
| E8 | C | C | C |
| E9 | C | A | A |
| E10 | A | C | C |
| E11 | A | C | A |

<Production of Yellow Toner Particles P1>

First, 580 parts of a 0.1-mol/l aqueous solution of Na$_3$PO$_4$ were charged into 710 parts of ion-exchanged water in a reaction vessel provided with a CLEARMIX (manufactured by M Technique) as a high-speed stirring machine, and the mixture was heated to 60° C. After that, the mixture was stirred with the CLEARMIX at 12,000 rpm. 88 parts of a 1.0-mol/l aqueous solution of CaCl$_2$ were added to the mixture, whereby an aqueous medium of a compound composed of phosphoric acid and calcium was obtained, the aqueous medium containing Ca$_3$(PO$_4$)$_2$ and having a pH of 5.0.

Meanwhile, a dispersoid was prepared as described below. First, C.I. Pigment Yellow 93 and 100 parts of a styrene monomer out of the following formulation were dispersed with an ATTRITOR (manufactured by Mitsui Miike Machinery Co., Ltd.) for 3 hours, whereby a colorant dispersion (1) was obtained. Next, all the remainder of the following formulation was added to the colorant dispersion (1), and the mixture was heated to 60° C. and mixed for 30 minutes so that the remainder was dissolved in the dispersion. 8 parts of 2,2'-azobis(2,4-dimethylvaleronitrile) as a polymerization initiator were dissolved in the solution, whereby a polymerizable monomer composition was prepared.

| [Formulation] | |
|---|---|
| (Polymerizable monomers) | |
| Styrene monomer | 160 parts |
| 2-ethylhexyl acrylate monomer | 40 parts |
| (Colorant) | |
| Coloring Compound D1 | 3 parts |
| C.I. Pigment Yellow 93 | 3 parts |
| (Charge control agent) | |
| Aluminum salicylate compound (BONTRON E-88 manufactured by Orient Chemical Industries, Ltd.) | 2 parts |
| (Polar resin) | |
| Polycondensate of propylene oxide-modified bisphenol A and isophthalic acid (glass transition temperature (Tg) = | 10 parts |

-continued

| [Formulation] | |
|---|---|
| 65° C., weight average molecular weight (Mw) = 10,000, number average molecular weight (Mn) = 6,000) (Release agent) | |
| Ester wax (Melting point 70° C., number average molecular weight (Mn) = 704) (Additive) | 25 parts |
| Divinylbenzene (purity 55%) | 0.5 part |

The above polymerizable monomer composition was loaded into the aqueous dispersion medium, and the mixture was granulated for 15 minutes while the number of revolutions of the high-speed stifling machine was maintained. After that, the high-speed stirring machine was changed to a propeller stirring blade, and the polymerization of the granulated product was continued for 5 hours while the temperature in the reaction vessel was maintained at 60° C. After that, the temperature in the reaction vessel was increased to 80° C., and the polymerization was continued for 8 hours. After the completion of the polymerization reaction, the remaining monomer was removed by distillation at 80° C. under reduced pressure, and then the remainder was cooled to 30° C., whereby a polymer fine particle dispersion was obtained.

Next, the polymer fine particle dispersion was transferred to a wash fountain, and dilute hydrochloric acid was added to the dispersion while the dispersion was stirred. The mixture was stirred for 2 hours while its pH was kept at 1.5, whereby the compound composed of phosphoric acid and calcium containing $Ca_3(PO_4)_2$ was dissolved. After that, the solution was subjected to solid-liquid separation with a filter, whereby polymer fine particles were obtained. The fine particles were loaded into water, and the mixture was stirred, whereby a dispersion was prepared again. After that, the dispersion was subjected to solid-liquid separation with a filter. The re-dispersion of the polymer fine particles in water and solid-liquid separation were repeated until the compound composed of phosphoric acid and calcium containing $Ca_3(PO_4)_2$ was sufficiently removed. After that, the polymer fine particles as a result of the final solid-liquid separation were sufficiently dried with a dryer, whereby yellow toner particles P1 having a volume average particle diameter of 7.6 μm were obtained.

<Production of Yellow Toner Particles P2>

First, 580 parts of a 0.1-mol/l aqueous solution of $Na_3PO_4$ were charged into 710 parts of ion-exchanged water in a reaction vessel provided with a CLEARMIX (manufactured by M Technique) as a high-speed stirring machine, and the mixture was heated to 60° C. After that, the mixture was stirred with the CLEARMIX at 12,000 rpm. 88 parts of a 1.0-mol/l aqueous solution of $CaCl_2$ were added to the mixture, whereby an aqueous medium of a compound composed of phosphoric acid and calcium was obtained, the aqueous medium containing $Ca_3(PO_4)_2$ and having a pH of 5.0.

Meanwhile, all of the following formulation was added, and the mixture was heated to 60° C. and mixed for 30 minutes so that the all was dissolved in the dispersion. 8 parts of 2,2'-azobis(2,4-dimethylvaleronitrile) as a polymerization initiator were dissolved in the solution, whereby a polymerizable monomer composition was prepared.

| [Formulation] | |
|---|---|
| (Polymerizable monomers) | |
| Styrene monomer | 160 parts |
| 2-ethylhexyl acrylate monomer | 40 parts |
| (Colorant) | |
| Coloring Compound D1 | 6 parts |
| (Charge control agent) | |
| Aluminum salicylate compound (BONTRON E-88 manufactured by Orient Chemical Industries, Ltd.) | 2 parts |
| (Polar resin) | |
| Polycondensate of propylene oxide-modified bisphenol A and isophthalic acid (Tg = 65° C., Mw = 10,000, Mn = 6,000) (Release agent) | 10 parts |
| Ester wax (Melting point 70° C., Mn = 704) (Additive) | 25 parts |
| Divinylbenzene (purity 55%) | 0.5 part |

The above polymerizable monomer composition was loaded into the aqueous dispersion medium, and the mixture was granulated for 15 minutes while the number of revolutions of the high-speed stirring machine was maintained. After that, the high-speed stirring machine was changed to a propeller stirring blade, and the polymerization of the granulated product was continued for 5 hours while the temperature in the reaction vessel was maintained at 60° C. After that, the temperature in the reaction vessel was increased to 80° C., and the polymerization was continued for 8 hours. After the completion of the polymerization reaction, the remaining monomer was removed by distillation at 80° C. under reduced pressure, and then the remainder was cooled to 30° C., whereby a polymer fine particle dispersion was obtained.

Next, the polymer fine particle dispersion was transferred to a wash fountain, and dilute hydrochloric acid was added to the dispersion while the dispersion was stirred. The mixture was stirred for 2 hours while its pH was kept at 1.5, whereby the compound composed of phosphoric acid and calcium containing $Ca_3(PO_4)_2$ was dissolved. After that, the solution was subjected to solid-liquid separation with a filter, whereby polymer fine particles were obtained. The fine particles were loaded into water, and the mixture was stirred, whereby a dispersion was prepared again. After that, the dispersion was subjected to solid-liquid separation with a filter. The re-dispersion of the polymer fine particles in water and solid-liquid separation were repeated until the compound composed of phosphoric acid and calcium containing $Ca_3(PO_4)_2$ was sufficiently removed. After that, the polymer fine particles as a result of the final solid-liquid separation were sufficiently dried with a dryer, whereby yellow toner particles P2 having a volume average particle diameter of 6.8 μm were obtained.

<Production of Yellow Toner Particles P3>

First, 580 parts of a 0.1-mol/l aqueous solution of $Na_3PO_4$ were charged into 710 parts of ion-exchanged water in a reaction vessel provided with a CLEARMIX (manufactured by M Technique) as a high-speed stirring machine, and the mixture was heated to 60° C. After that, the mixture was stirred with the CLEARMIX at 12,000 rpm. 88 parts of a 1.0-mol/l aqueous solution of $CaCl_2$ were added to the mixture, whereby an aqueous medium of a compound composed of phosphoric acid and calcium was obtained, the aqueous medium containing $Ca_3(PO_4)_2$ and having a pH of 5.0.

Meanwhile, all of the following formulation was added, and the mixture was heated to 60° C. and mixed for 30 minutes so that the all was dissolved in the dispersion. 8 parts of 2,2'-azobis(2,4-dimethylvaleronitrile) as a polymerization initiator were dissolved in the solution, whereby a polymerizable monomer composition was prepared.

| [Formulation] | |
|---|---|
| (Polymerizable monomers) | |
| Styrene monomer | 160 parts |
| 2-ethylhexyl acrylate monomer | 40 parts |
| (Colorant) | |
| Coloring Compound D3 | 6 parts |
| (Charge control agent) | |
| Aluminum salicylate compound | 2 parts |
| (BONTRON E-88 manufactured by Orient Chemical Industries, Ltd.) | |
| (Polar resin) | |
| Polycondensate of propylene oxide-modified bisphenol A and isophthalic acid (Tg = 65° C., MW = 10,000, Mn = 6,000) | 10 parts |
| (Release agent) | |
| Ester wax | 25 parts |
| (Melting point 70° C., Mn = 704) | |
| (Additive) | |
| Divinylbenzene (purity 55%) | 0.5 part |

The above polymerizable monomer composition was loaded into the aqueous dispersion medium, and the mixture was granulated for 15 minutes while the number of revolutions of the high-speed stirring machine was maintained. After that, the high-speed stirring machine was changed to a propeller stirring blade, and the polymerization of the granulated product was continued for 5 hours while the temperature in the reaction vessel was maintained at 60° C. After that, the temperature in the reaction vessel was increased to 80° C., and the polymerization was continued for 8 hours. After the completion of the polymerization reaction, the remaining monomer was removed by distillation at 80° C. under reduced pressure, and then the remainder was cooled to 30° C., whereby a polymer fine particle dispersion was obtained.

Next, the polymer fine particle dispersion was transferred to a wash fountain, and dilute hydrochloric acid was added to the dispersion while the dispersion was stirred. The mixture was stirred for 2 hours while its pH was kept at 1.5, whereby the compound composed of phosphoric acid and calcium containing $Ca_3(PO_4)_2$ was dissolved. After that, the solution was subjected to solid-liquid separation with a filter, whereby polymer fine particles were obtained. The fine particles were loaded into water, and the mixture was stirred, whereby a dispersion was prepared again. After that, the dispersion was subjected to solid-liquid separation with a filter. The re-dispersion of the polymer fine particles in water and solid-liquid separation were repeated until the compound composed of phosphoric acid and calcium containing $Ca_3(PO_4)_2$ was sufficiently removed. After that, the polymer fine particles as a result of the final solid-liquid separation were sufficiently dried with a dryer, whereby yellow toner particles P3 having a volume average particle diameter of 7.0 μm were obtained.

<Production of Yellow Toner Particles P4>

First, 580 parts of a 0.1-mol/l aqueous solution of $Na_3PO_4$ were charged into 710 parts of ion-exchanged water in a reaction vessel provided with a CLEARMIX (manufactured by M Technique) as a high-speed stirring machine, and the mixture was heated to 60° C. After that, the mixture was stirred with the CLEARMIX at 12,000 rpm. 88 parts of a 1.0-mol/l aqueous solution of $CaCl_2$ were added to the mixture, whereby an aqueous medium of a compound composed of phosphoric acid and calcium was obtained, the aqueous medium containing $Ca_3(PO_4)_2$ and having a pH of 5.0.

Meanwhile, all of the following formulation was added, and the mixture was heated to 60° C. and mixed for 30 minutes so that the remainder was dissolved in the dispersion. 8 parts of 2,2'-azobis(2,4-dimethylvaleronitrile) as a polymerization initiator were dissolved in the solution, whereby a polymerizable monomer composition was prepared.

| [Formulation] | |
|---|---|
| (Polymerizable monomers) | |
| Styrene monomer | 160 parts |
| 2-ethylhexyl acrylate monomer | 40 parts |
| (Colorant) | |
| Coloring Compound D8 | 6 parts |
| (Charge control agent) | |
| Aluminum salicylate compound | 2 parts |
| (BONTRON E-88 manufactured by Orient Chemical Industries, Ltd.) | |
| (Polar resin) | |
| Polycondensate of propylene oxide-modified bisphenol A and isophthalic acid (Tg = 65° C., Mw = 10,000, Mn = 6,000) | 10 parts |
| (Release agent) | |
| Ester wax | 25 parts |
| (Melting point 70° C., Mn = 704) | |
| (Additive) | |
| Divinylbenzene (purity 55%) | 0.5 part |

The above polymerizable monomer composition was loaded into the aqueous dispersion medium, and the mixture was granulated for 15 minutes while the number of revolutions of the high-speed stirring machine was maintained. After that, the high-speed stirring machine was changed to a propeller stirring blade, and the polymerization of the granulated product was continued for 5 hours while the temperature in the reaction vessel was maintained at 60° C. After that, the temperature in the reaction vessel was increased to 80° C., and the polymerization was continued for 8 hours. After the completion of the polymerization reaction, the remaining monomer was removed by distillation at 80° C. under reduced pressure, and then the remainder was cooled to 30° C., whereby a polymer fine particle dispersion was obtained.

Next, the polymer fine particle dispersion was transferred to a wash fountain, and dilute hydrochloric acid was added to the dispersion while the dispersion was stirred. The mixture was stirred for 2 hours while its pH was kept at 1.5, whereby the compound composed of phosphoric acid and calcium containing $Ca_3(PO_4)_2$ was dissolved. After that, the solution was subjected to solid-liquid separation with a filter, whereby polymer fine particles were obtained. The fine particles were loaded into water, and the mixture was stirred, whereby a dispersion was prepared again. After that, the dispersion was subjected to solid-liquid separation with a filter. The re-dispersion of the polymer fine particles in water and solid-liquid separation were repeated until the compound composed of phosphoric acid and calcium containing $Ca_3(PO_4)_2$ was sufficiently removed. After that, the polymer fine particles as a result of the final solid-liquid separation were sufficiently dried with a dryer, whereby yellow toner particles P4 having a volume average particle diameter of 6.9 μm were obtained.

Example 2

<Production and Evaluation of Yellow Toner>

100 parts of the yellow toner particles P1 were dry-blended with 1.8 parts of a silica fine powder subjected to a hydrophobic treatment and having a specific surface area measured by a BET method of 200 m²/g with a HENSCHEL MIXER (manufactured by MITSUI MINING. CO., LTD.), whereby Yellow Toner 1 was obtained. Further, 5 parts of Yellow Toner 1 were mixed with 95 parts of a ferrite carrier having a surface coated with an acrylic resin, whereby a two-component developer was obtained. An image was outputted with a reconstructed machine of a color copying machine CLC-1100 (manufactured by Canon Inc., reconstructed by removing a fixing oil applying mechanism) under an environment having a temperature of 25° C. and a humidity of 60% RH so that the toner was evaluated for its color tone. As a result, an image with a good yellow color having a value for c* of 75 or more at L*=91 was obtained.

Yellow Toner 2, 3, or 4 was produced with the yellow toner particles P2, P3, or P4, respectively in the same manner as in the case of Yellow Toner 1.

A developer was produced by using each of Yellow Toners 2 to 4 thus produced in the same manner as in the case of Yellow Toner 1, and each of the toners was evaluated for its color tone and lightfastness. Each of the yellow toners provided an image with a good yellow color having a value for c* of 75 or more at L*=91. In addition, Table 4 shows the results of the evaluation of those toners for their lightfastness.

Comparative Example 2

The inventors tried to produce yellow toner particles in the same manner as in the production of the yellow toner particles P2 except that Comparative Coloring Compound E8 was used as a colorant instead of Coloring Compound D1. However, the polymerization of a polymerizable monomer was inhibited, so the inventors could not obtain toner particles.

In addition, yellow toner particles Q1 (having a volume average particle diameter of 6.9 μm) were obtained in the same manner as in the production of the yellow toner particles P2 except that Comparative Coloring Compound E3 (6 parts) was used instead of Coloring Compound D1. Yellow Toner 5 was produced with the yellow toner particles Q1 in the same manner as in the case of Yellow Toner 1.

In addition, yellow toner particles Q2 (having a volume average particle diameter of 6.9 μm) were obtained in the same manner as in the production of the yellow toner particles P2 except that Comparative Coloring Compound E6 (6 parts) was used instead of Coloring Compound D1. Yellow Toner 6 was produced with the yellow toner particles Q2 in the same manner as in the case of Yellow Toner 1.

A developer was produced by using each of Yellow Toners 5 and 6 thus produced in the same manner as in the case of Yellow Toner 1, and each of the toners was evaluated for its color tone and lightfastness. Each of the yellow toners provided an image with a good yellow color having a value for c* of 75 or more at L*=91. In addition, Table 4 shows the results of the evaluation of those toners for their lightfastness.

TABLE 4

| Toner | Toner particles | Colorant | ΔE |
|---|---|---|---|
| 1 | P1 | D1 (3 parts) C.I. Pigment Yellow 93 (3 parts) | A |
| 2 | P2 | D1 (6 parts) | B |
| 3 | P3 | D3 (6 parts) | B |
| 4 | P4 | D8 (6 parts) | B |
| 5 | Q1 | E3 (6 parts) | C |
| 6 | Q2 | E6 (6 parts) | C |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-323745, filed Nov. 30, 2006, which is hereby incorporated by reference herein in its entirety.

The invention claimed is:

1. A coloring compound for a colorant for a yellow toner, comprising a structure represented by the following formula (1):

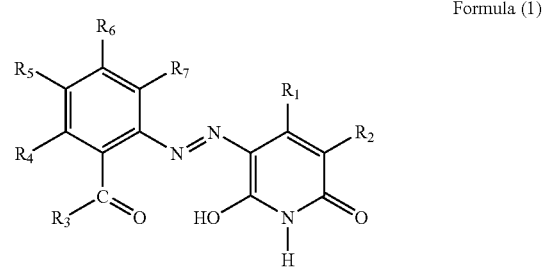

Formula (1)

wherein:

$R_1$ represents an alkyl group or an aryl group;

$R_2$ represents a hydrogen atom, a cyano group, or —$CONH_2$;

$R_3$ represents —$NR_8,R_9$, where $R_8$ and $R_9$ each independently represent a group selected from a methyl group, an ethyl group, an n-propyl group, an isopropyl group, an n-butyl group, a sec-butyl group, a tert-butyl group, an n-pentyl group, an n-hexyl group, an n-heptyl group, an n-octyl group, a 2-ethylhexyl group, an n-nonyl group, an n-decyl group, an n-undecyl group and an n-dodecyl group, and the total number of the carbon atoms of $R_8$ and $R_9$ is from 12 to 24; and $R_4$, $R_5$, $R_6$, and $R_7$ each independently represent a hydrogen atom, a halogen atom, —$CF_3$, —$NO_2$, an alkyl group, or an alkyloxy group.

2. A coloring compound according to claim 1, wherein, in the formula (1), $R_1$ represents a methyl group or a phenyl group.

3. A coloring compound according to claim 1, wherein, in the formula (1), $R_2$ represents a cyano group.

4. A yellow toner comprising yellow toner particles each comprising at least a binder resin and a colorant, wherein the colorant contains the coloring compound according to claim 1.

5. A yellow toner according to claim 4, wherein the colorant further contains a yellow pigment.

6. A yellow toner according to claim 4, wherein the yellow toner particles comprise toner particles produced by a suspension polymerization method.

* * * * *